United States Patent [19]

Stauffer

[11] Patent Number: 4,936,676

[45] Date of Patent: Jun. 26, 1990

[54] SURFACE POSITION SENSOR

[75] Inventor: Norman L. Stauffer, Englewood, Colo.

[73] Assignee: Honeywell Inc., Minneapolis, Minn.

[21] Appl. No.: 675,665

[22] Filed: Nov. 28, 1984

[51] Int. Cl.$^5$ .................... G01B 11/02; G01B 11/14
[52] U.S. Cl. ......................... 356/375; 356/1
[58] Field of Search ................... 356/1, 4, 375, 376

[56] References Cited

U.S. PATENT DOCUMENTS 4,558,949 12/1985 Uehara et al. ................. 356/1

FOREIGN PATENT DOCUMENTS

| 0071667 | 2/1983 | European Pat. Off. ............ 356/1 |
| 0156991 | 10/1985 | European Pat. Off. . |
| 3151800 | 9/1982 | Fed. Rep. of Germany . |
| 3222462 | 12/1983 | Fed. Rep. of Germany ........ 356/1 |
| W081-02628 | 9/1981 | PCT Int'l Appl. ............... 356/1 |
| 80-03-606 | 6/1980 | Sweden ..................... 356/1 |
| 424271 | 7/1982 | Sweden ..................... 356/1 |

OTHER PUBLICATIONS

"Position Sensing Photodetectors", United Detector Technology.
"Precision Non-Contact Measurement is Simpler than you Think", Selcom.
"Precimeter-non-contact precision probe", Remplir.
"Triangulation Distance Measurement with Optoelectronics", Quality Progress, Mar. 1983.
SPIE vol. 129, Effective Utilization of Optics in Quality Assurance (1977), "Position Sensing With Lateral Effect Photodiodes", B. O. Kelly.
Bodlaj, V. "Lambda—ein Lasermessverfahren", *Messen Prufer Automatisiera* (3-1985) pp. 118–126.
"Optical Alignment Apparatus", Smith et al, *IBM Technical Disclosure Bulletin*, vol. 18 #9, 499–500, 7/1975.

Primary Examiner—Richard A. Rosenberger
Attorney, Agent, or Firm—Charles L. Rubow

[57] ABSTRACT

A surface position sensor utilizing a beam of energy reflected from the surface through an optical receiver to a detector wherein an energy blocking member having a receiver aperture permits only energy substantially parallel to the optic axis of the optical receiver to pass through to the detector.

19 Claims, 2 Drawing Sheets

SURFACE POSITION SENSOR

BACKGROUND OF THE INVENTION

It is often desirable to be able to determine the distance to a surface or object without actually touching the surface or object itself. In the field of process controls, for example, it may be desirable to determine the placement of machine parts, materials, sheets, or irregularly shaped objects without using tape measures, rules, or other normal contact like devices.

Apparatus has been devised in the prior art based upon the principle of projecting a beam of energy such as infrared energy or visible light towards the object in question and then receiving reflected energy from the object to determine the distance to the object at the point where the light impinged thereon. Devices such as are described in Swedish Pat. No. 424,271, Swedish pre-published patent application No. 80-03-606, Internation patent application WO81-02,628, European patent application No. 0,071,667, and German "Offenlegungsschrift" No. 32,22,462 all show apparatus of this sort. The prior devices described in the prior art above are of two general sorts. The first directs a beam of energy perpendicularly towards the surface in question and depends upon the scattering of light from the surface to detect reflections which are emitted therefrom at an angle. The difficulty with this type of sensor is that it does not work well or at all on highly reflective or specular surfaces since the energy from mirror like surfaces will be reflected directly back towards the source of light and will not be reflected at an angle towards the detectors. In the second type of system described in the references above a beam of energy is directed at an angle towards the surface and the detector arrangement is located on the opposite side of the vertical. Either the transmitting optics or the receiving optics includes a movable lens or mirror for rebalance so that the detector receives energy even when the surface is highly reflective. The difficulty with this type of system is that movable elements vastly increase the complexity and cost of the system and as the surface moves from one position to another between its extremes, the reflected light emitted from a specular surface will focus at a different position when the surface is diffuse. It is therefore quite difficult to devise a detector scheme which can receive the reflected light in a meaningful way regardless of the surface condition.

SUMMARY OF THE INVENTION

The present invention overcomes the problems found in the prior art by providing a system which directs a beam of energy towards the surface at a predetermined angle so that it focuses the light at a point on the surface when the surface is in the middle or center position of its extremes. The light reflected from the surface is received by an optical system located at the same angle from the vertical but on the opposite side thereof and, as part of the optical system, an aperture is provided in the focal plane of a first lens so that only reflected energy which is directed parallel to the optic axis of the lens passes through the aperture. Thus, when light may be scattered from a diffuse surface in various directions, only those portions of the light that are substantially parallel to the optic axis pass through the optic system to reach the detector and the position of the reflected energy is the same as when the surface is specular. The electronics processing the signals received by the detectors is arranged so as to take care of different intensity variations that may occur between highly reflective and highly diffuse surfaces.

DETAILED DESCRIPTION OF THE PREFERRED EMBODIMENTS

Figure 1:
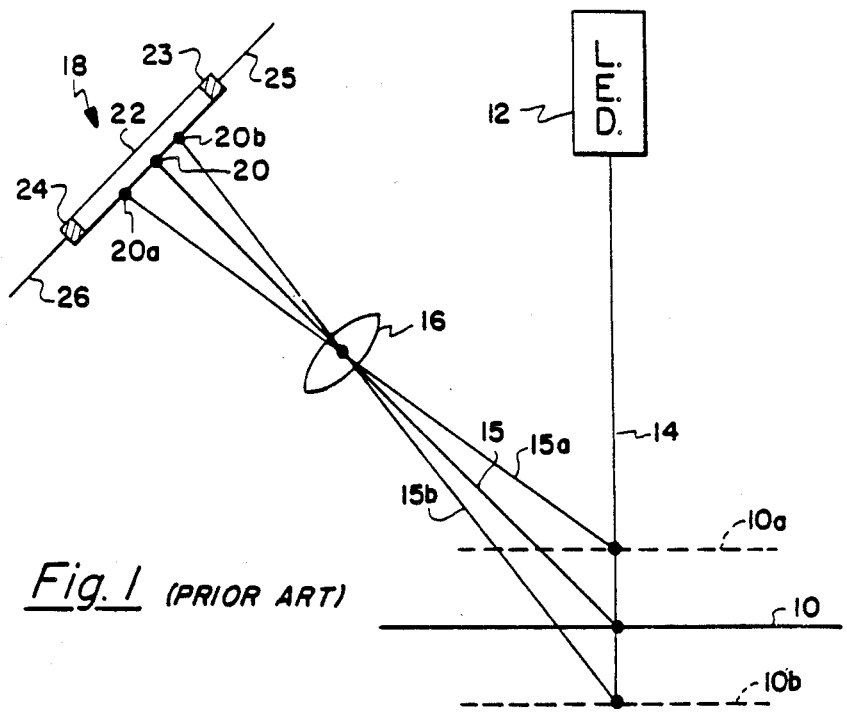
FIG. 1 shows a surface position sensor such as is found in the prior art.

In FIG. 1, a surface 10 is shown as being movable between two limiting positions shown as 10a and 10b. An energy transmitting device shown as a light emitting diode or LED 12 is shown projecting a beam of energy along a path 14 perpendicular to surface 10. It can be seen that if the surface is mirror like all of the energy reflected from surface 10 would come back along path 14. Assuming, however, that the surface is diffuse in nature, energy will be scattered from the surface at the point where the energy strikes it and, if the surface is at the center position shown, there will be some energy reflected along a path 15 while if the surface is located at position 10a there will be some energy reflected along a path 15a and if the surface is located at the position 10b, there will be some energy reflected along a path 15b. The reflected energy along and around all three paths will pass through a lens 16 so as to strike a detector 18 in an area centered about positions 20, 20a, or 20b depending upon the position of surface 10.

Detector 18 may be a position sensing photodetector such as is manufactured and sold by United Detector Technology Company under the designation LSC-30D, for example. This detector is of the type that consists of a central portion 22 and two end portions 23 and 24 to which connectors 25 and 26 may be connected. The signal on conductor 25 will be representative of the distance between the end portion 23 and the center of the spot of reflected light while the signal on conductor 26 will be representative of the distance between the end portion 24 and the center of the spot of reflected light. If the center of the spot of light is directly in the center of the detector portion 22, then the signals on conductors 25 and 26 will be equal. If, however, the spot of light is at position 20a, then the signal on conductor 26 will be larger than the signal on conductor 25 and if the light spot is centered about position 20b, then the signal on conductor 25 will be larger than the signal on conductor 26. By analyzing the signals on conductors 25 and 26 it is therefore possible to determine the position of the center of the reflected light on the detector 22. Since the position of the spot of light depends upon the position of the surface 10, the output can be calibrated so as to give an indication of the distance to the surface 10. It should be noted in FIG. 1 that not only does the system fail when the surfaces are very specular, but also the system is nonlinear in that the position 20b is nearer to position 20 than position 20a. This is because the angle of reflection from the surface changes with its position.

To overcome the problem of loss of signal when the surface 10 is mirror like, the prior art has suggested locating the transmitting optics at an angle with respect to surface 10 so that the detecting optics including lens 16 and detector 22 receive the reflected energy whether specular or diffuse. As seen in the references cited above, the prior art normally utilizes a movable lens or movable detecting optics to accomplish this result. The use of moving parts is highly undesirable because of cost and complexity but without moving parts the optics of the system become unreliable and the non-linear problem is not resolved a will be explained in connection with the embodiment of the present invention in FIG. 2.

Figure 2:
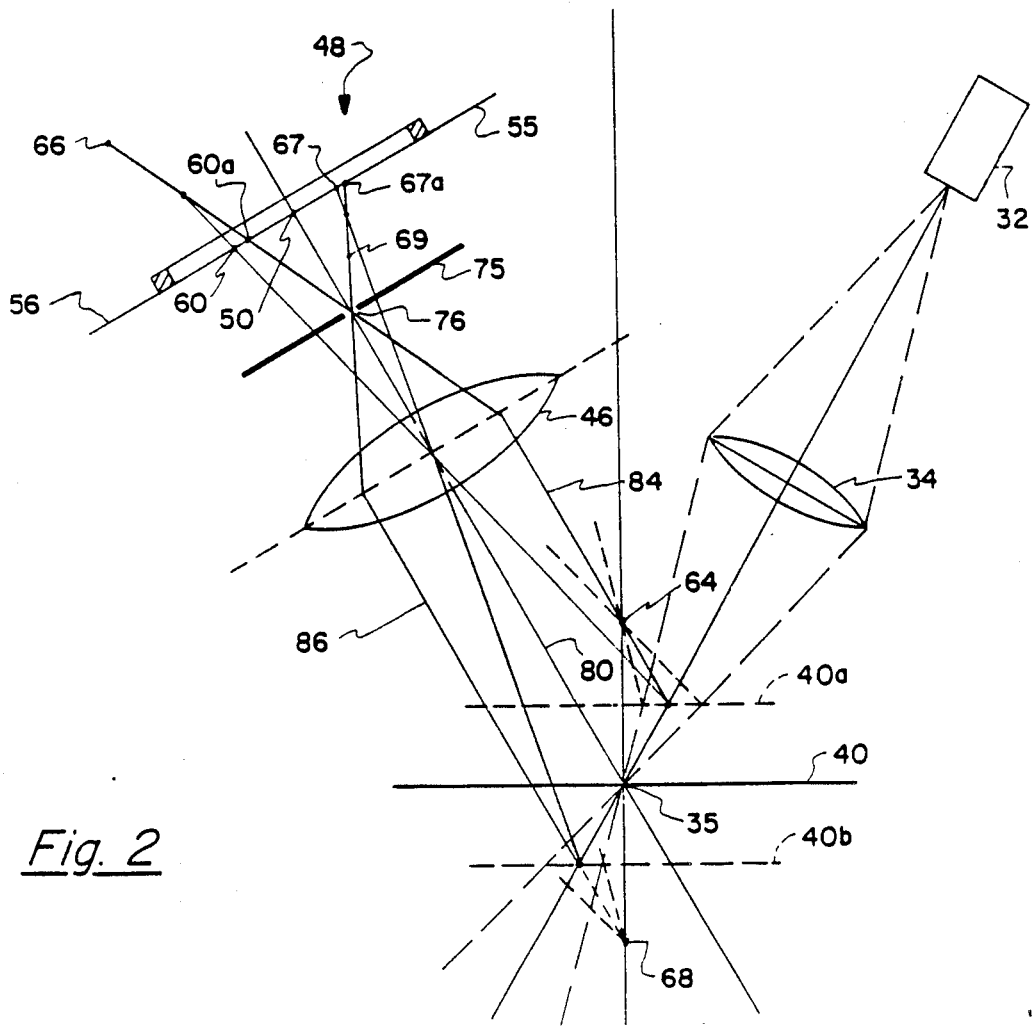
FIG. 2 shows one embodiment of the surface position sensor of the present invention.

In FIG. 2, an energy transmitter such LED 32 is shown directing energy through a lens 34 so as to focus at a point 35 on a surface 40, when the surface 40 is in its central or normal position. Dash lines 40a and 40b show the position of surface 40 in its upper and lower extreme respectively.

Energy reflected from point 35, whether the surface be mirror like or diffuse, will travel through a lens 46 and form a spot of energy on a detector 48 about a central point 50 thereon. Detector 48 may be like the detector 18 of FIG. 1 having a central portion 52 and end portions 53 and 54 to which conductors 55 and 56 are respectively attached.

When surface 40 is in position shown by dash line 40a, two conditions will result. The first occurs when the surface is diffuse in which case light will be scattered from surface 40a in all directions and the energy passing to lens 46 would be centered about a point 60 on detector 48, in the absence of the aperture which will be described later. On the other hand, if the surface 40 is highly specular, then when it is in position 40a, the energy striking thereon will be focused to a point 64 and thereafter, as far as the lens 46 and detector 48 are concerned, an image of point 64 will be focused at a point 66 which, in FIG. 2, is somewhat behind the detector 48. The radiation which would be imaged at 66 falls on the detector 48 and is centered at 60a. Similarly, when surface 40 is in position 40b and the surface is diffuse, energy will be centered about a point 67 on detector 48, in the absence of the aperture to be described, but when the surface is specular, the lens 46 and detector 48 see the energy as emanating from a point 68 which will produce a focus point 69 somewhat on the near side of detector 48. The radiation focused at 69 will continue and reach the detector 48 and produce spot centered at 67a. In other words, with a specular surface, motion of the surface 40 from 40b to 40a will cause reflections to appear to be emanating from a vertical line 70 which passe through point 35. The detecting optics therefore will see the energy as if it were transmitted from those points along axis 70 and the energy will be focused, not on detector 48 but at points in front of and in back thereof. This produces errors in the output since the energy on detector 48 will, with a diffuse surface, be a small area centered around points 60 and 67, but will be centered around points 60a and 67a slightly to the right of points 60 and 67 on detector 48 when the surface 40 is specular. Thus, different answers as to the position of surface 40 will be given when it is diffuse and when it is specular.

The present invention overcomes this problem by the insertion into the receiving optics of an energy blocking device 75 having an aperture 76 therethrough located at the focal point of lens 46. When the aperture is very small, only energy which is travelling substantially parallel to the optic axis of lens 46 will be able to pass through the aperture 76. Thus the ray identified by reference numeral 80 reflected from point 35 will pass through lens 46 and the aperture 76 to strike the detector 48 at the point 50 and this will be true whether the surface is specular or diffuse. In like manner, the ray travelling from point 64 identified by reference numeral 84 will pass through lens 46 and the aperture 76 to strike the detector 48 at point 60a and the ray travelling from point 68 identified by reference numeral 86 will strike the detector at a point 67a and these rays are the same rays as occur from a diffuse surface. Rays from a diffuse surface will reflect in all directions, but only rays parallel to 84 or 86 will pass through the otical system and reach the detector. Because the centers of the diffuse spots lie on an extension of line 84 or on line 86 the images of these areas on detector 48 will be in the same position as the images produced from a specular surface and the apparent sources of radiation 64 and 68. Thus, in all cases, whether the surface is diffuse or specular, energy is directed to the same point on detector 48 and thus gives an accurate indication of the position of surface 40.

Figure 3:
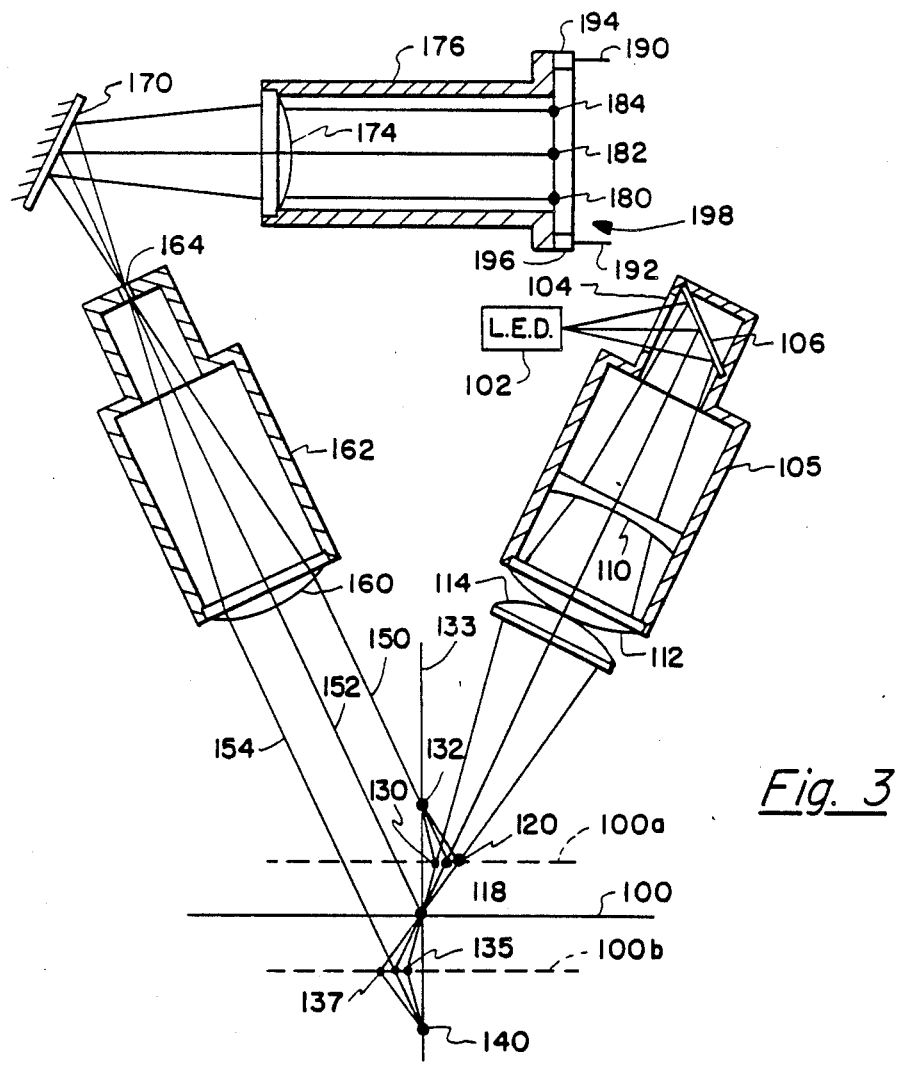
FIG. 3 shows a second embodiment of the surface position sensor of the present invention.

FIG. 3 shows a modification of the apparatus in FIG. 2 wherein the optics are folded so as to provide a more compact arrangement for use in a practical position indicator. In FIG. 3 a surface 100 is shown movable in a vertical direction to extreme positions shown by dash lines 100a and 100b. An energy projector such as a light emitting device 102 is shown projecting a beam of energy which may be infrared energy through an opening 104 in a housing 105. A mirror 106 is shown in housing 105 deflecting the energy down housing 105 to a negative lens 110 used to achieve a more precise focus and thence through lenses 112 and 114 to produce a focus at a point 118 on surface 100 when it is in its central position. It should be noted that the energy would be distributed from points 120 to 130 if the surface were in position 100a and that this energy would be focused to a point 132 on a vertical axis 145, which extends through point 118, if the surface were highly reflective. If the surface were at position 100b, then the energy would be distributed between points 135 and 137 and, to the optics of the receiving system, would appear to emanate from a point 140 on the vertical axis 145 Thus, with a highly reflective surface, the energy would appear to travel along a ray 150 if the surface were in position 100a, along a ray 152 if the surface were in its central position, and along a ray 154 if the surface were in the position 100b. If the surface were diffuse, then there would be rays in all directions emanating from point 118 when the surface was in position 100 and from between points 120 and 130 when the surface was in position 100a and from between points 135 and 137 when the surface was in position 100b. Many of these ray would find their way to a lens 160 mounted in a housing 162 but only those parallel to the optic axis of the system (line 152) would pass through an aperture 164 in the end of housing 162. These rays would then be reflected off a fixed mirror 170 and then pass through a second lens 174 mounted in a housing 176 so as to strike a detector 178 which may be the same type of detector as described in connection with FIG. 1. Because of aperture 164, only rays parallel to the optic axis of the system reach the detector 178 and, when the surface is a highly specular one, these are the rays 150, 152, and 154. These rays after passing through the optics will strike the detector 178 at points 180, 182, and 184 respectively. In similar fashion when the surface 100 is diffuse, only the rays that are passing parallel to the optic axis of the receiving optics will pass through aperture 164 and these, will be, a small bundle of rays centered about the lines 150, 152, and 154 just large enough to fit through the aperture 164. Again, these bundle of rays will produce small spots of light on detector 178 centered about points 180, 182, and 184 respectively and since the detector is a type which will produce an output indicative of the center of the light shinning thereon, the signals received on conductors 190 and 192 from the end portions 194 and 196 respectively, when processed, will be indicative of the position of surface 100 whether or not the surface is highly reflective or highly diffuse. Thus, the problem of producing a different point on the detector where light strikes from a diffuse surface and from a spectral surface is overcome in the present invention. It should also be noted that the distance between points 180 and 18 is substantially equal to the distance between point 182 and 184 and thus the problem encountered in the prior art of having non-linear distances depending upon the position of the surface is also overcome.

Figure 4:
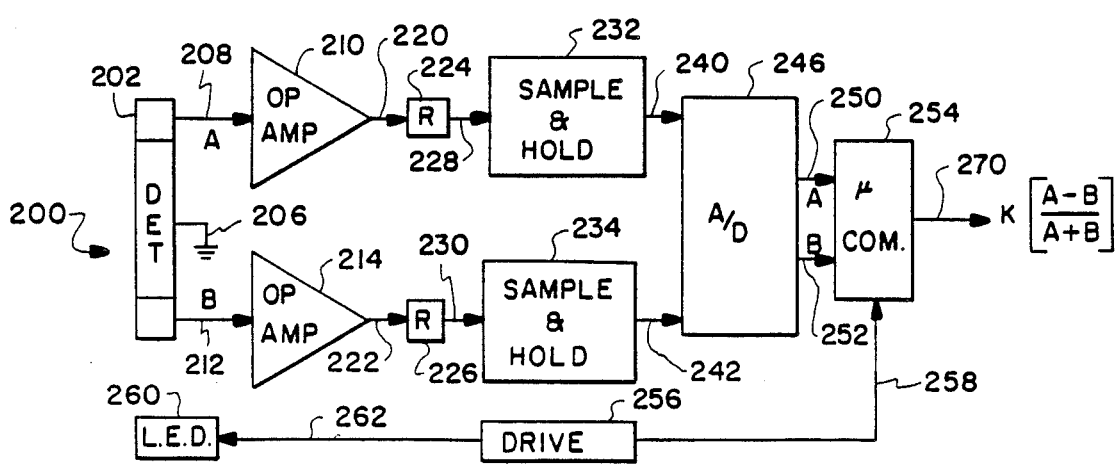
FIG. 4 shows a block diagram of the electronics used in connection with the present invention.

FIG. 4 shows a block diagram of an electronic system for processing the signals from conductors 190 and 192 in FIG. 3 so as to produce an output which is indicative of the vertical position of the surface 100 along axis 145 in FIG. 3.

In FIG. 4, a detector 200 is shown having end portions 202 and 204 similar to the arrangement shown in FIGS. 1 through 3 and may be the type of detector described in connection with FIG. 1. For convenience the center portion of the detector is shown to be grounded at conductor 206. The conductor 208 connected to end portion 202 is connected to an operational amplifier 210 and presents thereto a signal identified as "A". In similar fashion, a conductor 212 connected to end portion 204 is shown connected to a operational amplifier 214 so as to present a signal "B" thereto. As explained above, the signal "A" is of magnitude representative of the distance between the center of the spot of light on detector 200 and the end portion 202 while the signal "B" is indicative of the distance between the center of the spot of light on detector 200 and the end portion 204. When the spot of light is at the center of detector 200, signals "A" and "B" will be equal but when the spot of light is nearer to end 202, signal "A" will be larger than signal "B" and when the spot of light is nearer to detector 204, signal "B" will be larger than signal "A".

The output of operational amplifiers 210 and 214 are shown as conductors 220 and 222 respectively connected to rectifiers 224 and 226 respectively, the outputs of which are connected by conductors 228 and 230 respectively to sample-and-hold circuits 232 and 23 respectively. The rectifiers operate to make DC pulses from the AC outputs of the operational amplifiers and the sample-and-hold circuits collect these signals so that they may be released at the correct time. The signals from the sample-and-hold circuits 232 and 234 are shown connected by conductors 240 and 242 t an analog-to-digital converter 246 which converts the signals to digital form so that they may be presented via conductors 250 and 252 to a microcomputer 254. A drive circuit 256 is shown connected to the microcomputer 254 by conductor 258 and is also connected to the LED transmitter 260 by a conductor 262. Upon activation by the drive circuit 256, light from the LED 260 is transmitted to the remote surface and is reflected back to the detector 200 to form a spot thereon. Signals "A" and "B" are thus created which through operational amplifiers 210 and 214 and rectifiers 224 and 226 are presented to the sample-and-hold circuit 232 and 234 and thence simultaneously to the analog-to-digital converter 246 to be presented in digital form to the microcomputer 254. Microcomputer 254 is programmed to operate on the "A" and "B" signals in accordance with the formula $$K\left[\frac{A-B}{A+B}\right]$$

which is presented in FIG. 4 at the output conductor 270. The express $$K\left[\frac{A-B}{A+B}\right]$$

gives an indication of the difference in the signals "A" and "B" as compared to the total signal, A+B, available so that differences in light intensity will not change the output significantly. This fraction varies the position of the spot of light on detector 200 and thus with the position of surface 100 but is a pure fraction and is dimensionless. The value of "K" operates to change the pure fraction to a distance value as, for example, centimeters from a normal position. Thus the output on line 270 may be read by a suitable meter, not shown, to produce an indication of the position of surface 100 relative to some fixed position such as the center position.

It is thus seen that I have provided apparatus for determining the position of an object or surface which overcomes the problems found in the prior art. The apparatus works equally well with diffuse and specular surfaces and produces outputs which are relatively linear with surface position. Many modifications will occur to those skilled in the art and I do not intend to be limited to the specific disclosures used in connection with the description of the preferred embodiments. I intend only to be limited by the following claims.

I claim:

1. Apparatus for detecting the position of a surface along a first axis comprising:
   energy emitting means;
   directing means directing energy from said energy emitting means to the reflecting surface at an angle to the first axis;
   receiving means having an optic axis positioned to receive reflected from the surface;
   energy blocking means having an aperture therein positioned along the optic axis so that only energy reflected from the surface substantially parallel to the optic axis passes through the aperture;
   energy detecting means positioned to receive energy passing through the aperture, the position of the received energy on the energy detecting means varying with the position of the surface along the first axis; and
   means connected to the detecting means to provide an output signal indicative of the position of the surface, wherein the detecting means has first and second ends and produces a first signal A which varies with the distance between the position of the energy and the first of the ends, produces a second signal B which varies with the distance between the position of the energy and the second of the ends and wherein the means connected to the detecting means produces the output signal in accordance with $$K\left[\frac{A-B}{A+B}\right]$$

where K is a factor for scaling the output in terms of distance.

2. Apparatus for use with a surface position sensor, the surface being sensed capable of moving along a reference axis perpendicular to the surface, the sensor being of the type including a source directing energy generally along an output axis to the surface at a first angle from the reference axis and receiving means having an optic axis with the optic axis at an angle from the reference axis equal to the first angle but on the opposite side from the input axis and energy detector means to receive the energy reflected from the surface through the receiving means at a position which varies with the position of the surface along the reference axis, the improvement comprising:

blocking means mounted along the optic axis and having an aperture positioned so that the only energy reflected from the surface reaching the detector means is that portion which is substantially parallel to the optic axis; and means connected to the detecting means to provide an output signal indicative of the position of the surface, wherein the detecting means has first and second ends and produces a first signal A which varies with the distance between the position of the energy and the first of the ends, produces a second signal "B" which varies with the distance between the position of the energy and the second of the ends and wherein the means connected to the detecting means produces the output signal in accordance with $$K\left[\frac{A-B}{A+B}\right]$$

where K is a factor for scaling the output in terms of distance.

* * * * *